United States Patent [19]

Klaschka

[11] Patent Number: 4,535,706
[45] Date of Patent: Aug. 20, 1985

[54] FLUIDISED BEDS

[75] Inventor: John T. Klaschka, Fleet, England

[73] Assignee: Sodic Societe Anonyme, Fribourg, Switzerland

[21] Appl. No.: 592,725

[22] PCT Filed: Aug. 28, 1981

[86] PCT No.: PCT/GB81/00172

§ 371 Date: Apr. 20, 1982

§ 102(e) Date: Apr. 20, 1982

[87] PCT Pub. No.: WO82/00871

PCT Pub. Date: Mar. 18, 1982

Related U.S. Application Data

[63] Continuation of Ser. No. 375,119, Apr. 20, 1982, abandoned.

[30] Foreign Application Priority Data

Aug. 29, 1980 [GB] United Kingdom ............... 8028032

[51] Int. Cl.³ .................. F22B 1/02; F23G 5/00
[52] U.S. Cl. .................... 110/245; 122/4 D
[58] Field of Search ............ 122/4 D; 110/245

[56] References Cited

U.S. PATENT DOCUMENTS

| | | | |
|---|---|---|---|
| 3,397,657 | 8/1968 | Tada | 110/245 |
| 3,745,940 | 7/1973 | Hibbert | 110/244 |
| 4,227,488 | 10/1980 | Stewart et al. | 110/245 |
| 4,270,468 | 6/1981 | Robinson et al. | 122/4 D |
| 4,323,037 | 4/1982 | Meyer-Kohrweg | 110/245 |
| 4,330,502 | 5/1982 | Engstrom | 110/245 |
| 4,335,662 | 6/1982 | Jones | 110/245 |
| 4,349,969 | 9/1982 | Stewart et al. | 110/245 |
| 4,363,292 | 12/1982 | Engstrom | 110/245 |
| 4,377,119 | 3/1983 | Noack | 110/245 |

FOREIGN PATENT DOCUMENTS

| | | |
|---|---|---|
| 0005965 | 12/1979 | European Pat. Off. |
| 934521 | 8/1963 | United Kingdom |
| 1522601 | 8/1978 | United Kingdom |
| 2027527 | 2/1980 | United Kingdom |

Primary Examiner—Henry C. Yuen
Attorney, Agent, or Firm—Ladas & Parry

[57] ABSTRACT

Fluidised bed combustor comprising a housing (10) and an air diffuser bed support arrangement (12, 14, 15, 16) disposed in the housing (10) to support and fluidise a bed of material (11) in the housing (10) in such a manner that there is formed in the bed (11), a combustion zone (17) in which material is burned. A feed zone (19) into which material of fuel to be burned may be fed and mixed with the material of the bed (11), an ash segregation zone (20) in which ash resulting from combustion may be at least partially separated from the bed material, and in which the diffuser (13, 14, 15, 16) is arranged to cause the bed material to circulate in operation from the combustion zone (17), through the feed zone (19), through the ash segregation zone (20) and back into the combustion zone (17). In a second mode a circulation takes place through the combustion zone (17), a drive zone (18) over and onto the surface (26) of the bed (11), partly into the feed zone (19) and partly back into the combustion zone (17).

16 Claims, 1 Drawing Figure

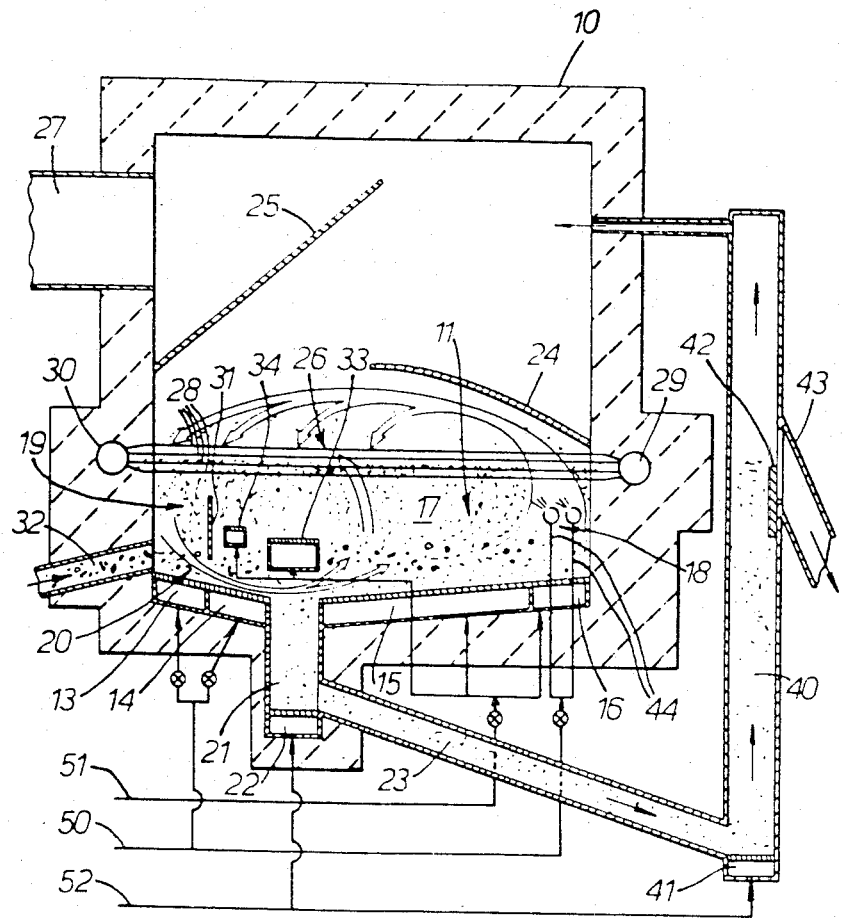

FLUIDISED BEDS

This is a continuation of copending application Ser. No. 375,119, filed Apr. 20, 1982, now abandoned.

This invention relates to a fluidised bed combustion apparatus and to furnaces and/or incinerators embodying such apparatus. The invention is particularly concerned with the improvement of combustion in such fluidised bed apparatus, particularly combustion of waste material of either high or low calorific value and other high or low grade fuels; either with the object of waste disposal, or for the generation of heat for some useful purpose, or for a combination of those objects.

It has been proposed to provide fluidised bed combustion apparatus in which a fluidised bed of granular material is supported in a housing or a combustion chamber on an air diffuser bed support.

In such an arrangement fuel or waste material to be burned either to raise heat or for disposal purposes, is fed into the fluidised bed to be burned therein. The oxygen for such combustion comes at least in part, and usually entirely, from air fed into the bed from the diffuser support to fluidise the bed. The bed of granular material is usually sand or other refractory material and may comprise in part, or even totally, granular ash residue from previous combustion.

The diffuser in some cases is arranged to slope from one side of the bed to an opposite side, and it has been proposed that the supply of fluidising air to various areas of the diffuser should be selectively controlled to fluidise the bed material to a varying degree above those areas so that circulation of the bed material about a transverse horizontal axis is caused.

It is an object of the present invention to provide an arrangement of such a fluidised bed which gives improved combustion conditions.

Accordingly the present invention provides a fluidised bed combustor in which material may be burned in a combustion zone of a fluidised bed and the material of such fluidised bed may be caused to circulate from the combustion zone across and over an upper region of the bed from one side of the bed, down through a feed zone of the bed, into which feed zone material to be burned may be fed and mixed with the material of the bed, and then through an ash segregation zone of the bed back into the combustion zone of the bed.

Preferably a baffle having vertical extent is provided in the fluidised bed to separate the feed zone from the combustion zone.

Preferably the air diffuser bed support provided in the combustor for the fluidised bed is divided into discrete portions and means is provided for selectively controlling the air flow from those portions into the bed so as to promote such circulation.

Preferably the air diffuser portion below said one of the bed is arranged to fluidise the bed on that one side vigorously so as to provide means for driving such circulation.

Preferably the supply of air to the bed is arranged so that bed material circulates from said ash segregation zone directly through the combustion zone and on to the top of the feed zone.

Preferably means is provided to control the air flow to the combustion zone separately.

Preferably means is provided to control the air flow to the ash segregation zone separately.

Preferably a gap is provided in the air diffuser between the portions associated with the ash segregation zone and the combustion zone to form a trough for the extraction of ash resulting from combustion.

Preferably the bottom of such trough is provided with an air diffuser to fluidise the bed material therein.

Preferably means is provided to control the supply of air to the feed zone separately.

Preferably a baffle is provided above the fluidised bed extending from said one side at least partially across the bed towards said other side.

Preferably a secondary air diffuser is provided in the bed above the ash segregation zone in the fluidised bed extending at least over the ash trough.

Preferably heat exchange means is provided to lie just within the surface of the bed in operation thereof, whereby heat may be extracted from the bed.

Preferably the ash trough is connected to a conduit leading to the bottom of a vertical conduit so that bed material and ash may be carried to the bottom of the vertical conduit therein, and means is provided to vigorously fluidise bed material and ash in the vertical conduit to lift it to an upper part thereof to exit from the vertical conduit over a weir.

Preferably the height of the weir is adjustable.

In a further aspect the invention provides a fluidised bed combustor comprising a housing and an air diffuser bed support arrangement disposed in the housing to support and fluidise a bed of material in the housing in such a manner that there is formed in the bed, a combustion zone in which material to be burned is burned. A feed zone into which material or fuel to be burned may be fed and mixed with the material of the bed, an ash segregation zone in which ash resulting from combustion may be at least partially separated from the bed material, and in which the diffuser is arranged to cause the bed material to circulate in operation from the combustion zone, through the feed zone, through the ash segregation zone, and back into the combustion zone.

Preferably the air diffuser bed support is divided into separate portions and provided with means for selectively controlling the air flow from those portions individually, a feed portion being disposed beneath the feed zone, an ash segregation portion being disposed beneath the ash segregation zone, and a combustion portion being disposed beneath the combustion zone.

Preferably an ash trough is provided in said diffuser support extending substantially between said ash segregation zone and said combustion zone.

Preferably a circulation drive air diffuser portion is provided beneath a circulation drive zone of the bed adjacent the combustion zone and on a side thereof opposite to the feed zone.

Preferably heat exchange means is provided in the housing to lie within the surface of the bed in operation thereof so that heat may be extracted from the bed.

Preferably a conduit leads from the botttom of said ash trough to the bottom of a generally vertical conduit extending outside the housing to above the surface of the bed, means being provided in the bottom of the vertical conduit to fluidise bed material and ash therein, and in which a weir being provided in the vertical column over which ash material and any entrained bed material may be ejected.

Preferably in operation the height of the surface of the bed is controlled by the height of said weir, the material in the vertical conduit being fluidised to a sufficient extent to achieve flow of excess material over the weir.

Preferably the rate of heat extraction from the bed is controlled by varying the height of the bed to adjust the contact of the bed with heat exchange means.

Preferably a separately controllable air supply is provided for fluidising said feed zone, said ash segregation zone and said drive zone.

Preferably a separately controllable air supply is provided for fluidising said combustion zone.

Preferably in operation said circulation takes place in a first mode from said combustion zone through said feed zone and ash segregation zones, and in a second mode through the combustion zone, and said drive zone over and onto the surface of the bed, partly into the feed zone and partly back into the combustion zone.

Preferably the diffuser beneath at least the combustion zone and preferably the other zones of the bed comprises a plate having air nozzles in the form of upstanding tubes extending between 20 and 100 millimeters above the plate, and having outlet orifices at or adjacent their upper ends.

In order to promote a fuller understanding of the above and other aspects of the present invention, an embodiment will now be described, by way of example only, with reference to the accompanying drawing which shows in schematic cross-section a side view of a combustor embodying the invention.

The drawing shows a fluidised bed combustor having a housing 10 for a fluidised bed indicated generally at 11. The fluidised bed is supported in the housing by an air diffuser bed support indicated generally at 12 which comprises four discrete portions 13, 14, 15 and 16. The fluidised bed 11 may be considered as divided into a combustion zone indicated generally at 17, lying above the diffuser portion 15; a circulation drive zone indicated generally at 18 above the diffuser portion 16; a feed zone indicated generally at 19 above the diffuser portion; and an ash segregation zone indicated generally at 20 lying above the diffuser portion 14.

The air diffuser portions 14 and 15 are spaced apart to leave an ash trough 21 which is provided with an air diffuser 22 forming its bottom wall and an ash outlet conduit 23 leading from the ash trough 21.

The bottom wall or diffuser 22 of the ash trough is preferably arranged to slope downwards in a direction normal to the plane of the drawing at an angle of between 3° and 15° to the horizontal to promote movement of bed material, particularly larger non-fluidising particles towards the lower end of the trough. The conduit 23 is preferably arranged to lead off from such lower end of the ash trough, and slopes downwards away from the ash trough at between 10° and 70° to the horizontal.

The housing 10 and the diffuser bed support of this embodiment are rectangular in plan view, although it will be appreciated that the sides adjacent the portions 13 and 16 may be curved in plan view as indeed may the ends of the diffuser between the portions 13 and 16.

A baffle or bouncer plate 24 is provided in the housing 10 extending from one side of the housing adjacent the circulation drive zone 18, curving towards and over the bed 11 towards the opposite side of the housing adjacent the feed zone 19. A second baffle 25 is provided to extend from that opposite side of the housing 10 towards and preferably to overlap the curved baffle 24, so as to provide a tortuous path from the upper surface of the fluidised bed which is indicated generally at 26, to a combustion gas outlet flue indicated generally at 27.

A series of heat exchange tubes 28 are provided extending across the housing 10 between headers 29 and 30 so that a heat exchange medium such as water or other liquid, or a gas may be passed through the tubes to take up heat from the bed 11 during operation of the combustor.

A generally vertical baffle 31 is provided between the combustion zone 17 and the feed zone 19 extending across the bed normal to the plane of the drawing. An inlet 32 is provided in the housing 10 opening into the lower portion of the feed zone 19, and means (not shown) is provided to drive material to be burned through the inlet 32 into the feed zone. Such drive means may be of any suitable type, such as a screw feed for solid material or pressure ducts for liquid or gaseous material.

A secondary air diffuser 33 is provided in the bed 11 extending at least over the ash trough 21 and spaced a small distance above the diffuser portions 14 and 15. The diffuser 33 may be associated with further secondary diffusers 34 extending across the bed 11 over the ash segregation zone 20.

Means is provided in known manner per se to supply air under pressure to the various air diffuser portions and/or secondary diffusers. The arrangement is such that the air supply to the diffuser portions 14, 15 and 16 and the secondary diffusers 33 and 34 may be controlled so that the velocity of the air leaving those diffusers to fluidise the bed material above may be selectively controlled. Means is also provided to control the velocity of air leaving the diffuser 22 and the diffuser portion 13.

The ash outlet conduit 23 leads away from the trough 21 to the bottom of a generally vertical conduit 40. The bottom of the conduit 40 is provided with means indicated in 41 for the injection of fluidising air, and is provided at the top with a weir 42 which is adjustable in height and arranged to separate the column 40 from an outlet pipe 43. The upper end of the conduit 40 is vented into the housing 10 above the level of the fluidised bed. Means is provided to control the supply of air to the conduit 40 independently of the other air diffusers.

In the circulation drive zone 18 above the diffuser portion 16 means are provided to enhance the drive of bed material upwards and across under the panel 24. These means comprise standpipes 44 arranged in two rows across the width of the bed in a direction normal to the figure connected by way of a control valve to a supply of air under pressure. The standpipes 44 extend to just below the surface of the bed and terminate in horizontal tubes having outlet orifices arranged therealong directed upwardly and inwardly into the bed.

In operation of the combustor the bed material is fluidised with air, and material to be burned is fed into the bed and burned therein with the oxygen contained in that air.

Combustion takes place basically in the combustion zone 17 above the diffuser portion 15. Bed material together with the ash is caused to migrate and/or circulate through the combustion zone 17 in two fashions or modes. A first circulation mode is caused in the bed upwards in the combustion zone 17 across the surface of the bed over the baffle 31, down through the feed zone 19 and back into the combustion zone 17. A second mode of circulation takes the bed material and ash upwards in the circulation drive zone 18 and out of the surface of the bed beneath the baffle 24 and across the surface of the bed to fall back into the bed across the surface of the bed and towards the feed zone 19.

The feed zone is fluidised with air leaving the diffuser portion 13 at a velocity between the minimum fluidisation velocity having regard to the nature of the bed material and the depth of the bed, and 5 times that minimum fluidisation velocity. Material to be burned is injected into the feed zone well below the surface of the bed at a velocity of between 1 and 10 meters a second depending on the nature of the material to be burned. The feed zone 19 may comprise between 5% and 20% of the bed plan area.

The ash segregation zone 20 above the diffuser portion 14 is fluidised with air leaving the diffuser at a velocity chosen to segregate ash (of a particle size greater than 2 mm). This zone is fluidised with air at a velocity preferably between 3 times and 8 times the minimum fluidisation velocity and may occupy between 5% and 20% of the plan area of the bed.

The combustion zone 17 above the diffuser portion 15 is fluidised for complete and rapid combustion of material to be burned therein.

The circulation drive zone 18 above the diffuser portion 16 is fluidised at a velocity beyond the terminal velocity of the bed material by means of air injected by the standpipes 44, so as to eject bed material from the bed at the top to be deflected across the top of the bed by a baffle 24. The zone may comprise from 3% to 15% of the bed plan area. The standpipes 44 terminate preferably from 25% to 50% of the depth of the bed below the surface of the bed, in this embodiment being of some 8 mm internal diameter. The orifices in the horizontal tubes connected to the tops of the standpipes 44 are preferably angled at between 30° to 60° to the vertical, and directed towards the feed zone of the bed.

Each of the air diffuser portions 13, 14, 15 and 16 and the diffusers 22, 33 and 34 may be in the form of a plate having air distribution nozzles disposed in a pattern in that plate, and may preferably include a wire mesh across such nozzles to prevent sand back flow through the diffuser.

The nozzles in the diffuser portions 13, 14, 15, 16 and optionally the diffusers 33 and 34 and the diffusers 22 and 41 preferably comprise tubes extending upwards from the diffuser plate by between 20 mm and 100 mm from the plate surface. The bore of such tubes is preferably between 1.5 mm and 8 mm and they are preferably arranged on a square matrix at between 15 mm and 95 mm spacing.

The selection of the particular dimensions within these ranges is dependent upon the depth of the bed material being burned therein in any particular case. The nozzles of the air diffusers are sized and arranged so that the air velocity through the nozzles is preferably between 25 m and 75 m per second, except the nozzles in the diffuser portion 16 where it is arranged that the velocity of air through the nozzle is between 50 m and 150 m per second.

The nozzles of the diffuser as mentioned above may be screened by a wire mesh which preferably has openings of a size between 200 and 1000 microns. In the alternative, the nozzle tubes may have blanked tops with outlet orifices provided on the side adjacent the top. The vertical height of the nozzle tubes, particularly in the combustion zone, is chosen to give a layer of unfluidised sand immediately above the diffuser plate, thus insulating the diffuser plate from the main temperature of the combustion, ideally the diffuser plate temperature being kept to less than 300° C.

The circulation pattern from the combustion zone through the feed zone and ashing zone back to the combustion zone is at least partially driven by a net bed depth difference between the combustion zone and the feed zone promoted by a different fluidising velocity in the respective zones. This pattern is arranged to assure good distribution of the material to be burned from the feed zone where preheating and ignition takes place, into a combustion zone where burning takes place. The circulation velocities in this first circulation are preferably between 0.05 and 0.5 m per second. The second circulation from the circulation drive zone 18 over the top of the bed and into the feed zone ensures continuous burial of feed material in the feed zone and prevents excessive freeboard burning of material and carry-over into the flue gases. Circulation mass flow rates in this second fashion of circulation are preferably between 40 kg and 200 kg per second per square meter of bed cross-section. A secondary function of this second circulation is to pass bed material through the free-board above the surface of the bed to scavenge any heat released by over-bed burning and carry it back into the main bed.

The baffle 31 between the feed zone and the combustion zone is preferably arranged with its bottom arranged between 0.05 and 0.2 m above the outlets of the nozzles of the diffuser portions 13 and 14 and extends to 0.8 m to 0.4 m in height. The baffle 24 preferably extends at an angle generally between 15° and 45° to the horizontal and extends between 30% and 70% of the width of the bed as seen in the drawing. A secondary function of the baffle is suppression of carry-over of bed material into the flue gases by providing a surface on which bed material ejected by bubbles bursting on the bed surface, can impinge and be thus returned to the bed.

The bed material and ash in the conduit 40 is fluidised with air at a velocity between the minimum for fluidisation of the material and the conduit and five times that minimum velocity in order to discharge material over the weir 42. By this means ash and bed material may be driven out to the outlet pipe 43 selectively, and the depth of the bed in the housing 10 may be lowered. The depth of the bed in the housing 10 may of course be increased by the supply of further bed material and material to be burned without extraction of bed material through the conduit 40. In normal operation of the bed the height of the bed in the housing is controlled by adjustment of the height of the weir 42. The diffuser 22 in the ash trough 21 is preferably inclining at between 3° and 15° to the horizontal sloping down towards the outlet conduit 23 to promote the movement of larger nonfluidising ash lumps towards the outlet 23. Such sloping is of course in a direction normal to the plane of the drawing.

The heat exchange tubes 28 are preferably arranged to extend over a vertical height of between 0.1 and 0.3 m so that the rate of heat extraction from the bed can be controlled by raising or lowering the level of the surface of the bed, thus effectively varying the surface area of the heat exchange tubes which is in contact with the bed. The supply of air to the various diffuser portions and the standpipes 44 is preferably arranged through two separate main supply manifolds indicated at 50 and 51. A third supply manifold indicated at 52 is provided for the diffusers 22 and 41. The diffuser portions 13 and 14 and the stand pipes 44 are connected by way of suitable flow control valves to the manifold 50 whereas the diffuser portions 15, 16, 33 and 34 are connected by way of suitable flow control valves to the manifold 51. By this means the flow to the circulation drive zone 18, the feed zone and the ashing zone may be controlled separately from the supply of air to the combustion zone. This circulation of the bed may be maintained independently of the rate of supply of material to the combustion zone for combustion purposes, thus enabling variable rates of combustion to be achieved without affecting the circulation pattern of material in the bed.

In operation of the bed the air supply to the diffuser portions 13, 14 and standpipes 44 is arranged and controlled as mentioned to promote general circulation of the bed. During start up of the combustor air is fed by the manifold 51 to the diffuser portions 15, 16, 33 and 34 to fluidise the combustion zone particularly. A readily combustible fuel, such as gas, for example propane gas, is introduced with the air and ignited to burn in the combustion zone 17, thus heating up the material of the bed to some 600° C. to 800° C. Since the bed is caused to circulate the whole bed material will be gradually raised to such temperature. Material to be burned is introduced through the inlet 32 to the lower part of the feed zone 19 and carried from the feed zone through the ash segregation zone into the combustion zone 17 to ignite and burn therein; and the heat from combustion then sustains the normal operating temperature of some 800° C. to 900° C., assuming the calorific value of the fuel is sufficient, without the need for supply of fuel to the diffuser 15 which can then be discontinued. If for any reason the calorific value of a particular material to be burned is not sufficient to sustain combustion, the supply of fuel to the diffuser could be continued although invariably on a much reduced scale, or higher calorific value fuel can be fed with the other material in the inlet 23.

As a result of combustion, ash or other incombustible residue is formed in the combustion zone 17 and larger and heavier particles or lumps will fall in the combustion zone and find their way into the ash trough 21, the diffuser portion 15 sloping downwards towards the trough 21 to this purpose. The bulk of the ash and other residue formed will be carried in the circulation of the fluidised bed described above into and down through the feed zone 19 to the ash segregation zone 20. The fluidisation in the ash segregation zone 20 achieved by the diffuser portion 15 is controlled to promote separation of ash and residue from the basic bed material so that this falls to the bottom, down the diffuser portion 14 which also slopes towards the ash trough 21, into the ash trough. Thus it can be seen that ash resulting from combustion will be carried to the trough 21 while material to be burned is fed into the bed beneath the surface and is continuously buried in the feed zone 19.

The degree of fluidisation in the ash trough 21 achieved by the diffuser 22 is controlled to promote separation of ash and residue from the bed material so that the ash and residue passes to the conduit 23, while the bed material per se is substantially retained in the bed. The supply of air to the secondary diffusers 33 and 34 is arranged so that the bed above them forming an extension of the combustion zone 17 is fluidised and there is sufficient air to support combustion above them, despite the control of the air from the diffuser portions 14 and 22 for the purposes described above.

The air injected into the bed in the circulation drive zone 18 is arranged to drive the bed material towards and out of the surface of the bed to impinge on the baffle 24. Thus bed material is then deflected across the bed towards the feed zone, falling back on to the surface of the bed. This action helps to bury any combustible material escaping from the surface of the bed, and thus reduce conbustion above the surface of the bed; and as mentioned, absorbs any heat produced by combustion above the surface of the bed and carries that heat back into the bed.

As mentioned, ash and residue material passes into and down the conduit 23 from the ash trough 21 and passes then into the bottom of the vertical conduit 40. The supply of air to the diffuser 41 is arranged to maintain the ash material in the conduit 40 fluidised so that a complete "U"-tube of material is formed between the bed and the housing 10 of the material in the conduit 40. The weir 42 is adjusted so that the height of the bed in the housing 10 is maintained at a desired level having regard to the desired heat extraction by the heat exchange tubes 28 as discussed above. Surplus material overflows from the conduit 40 into the outlet 43 thus achieving ash removal from the bed. Thus the height of the weir 42 is used to control the height of the bed and the heat extraction from it.

If it is desired to empty the bed at any time, the fluidisation by the diffusers 22 and 41 may be adjusted so that the entire bed material may be conveyed out of the bed through the conduit 40.

In operation to extract ash, the diffusers 22 and 41 may be operated on a continuous basis for continuous removal of ash, or intermittently for the timed intermittent removal of ash.

I claim:

1. A fluidised bed combustor comprising a housing and an air diffuser bed support arrangement disposed in the housing to support and fluidise a bed of material in the housing, there being formed in the bed a combustion zone in which material to be burned is burned, a feed zone into which material or fuel to be burned may be fed and mixed with the material of the bed, an ash segregation zone in which ash resulting from combustion may be at least partially separated from the bed material, and in which a diffuser is arranged to cause the bed material to circulate in operation around a path extending from the combustion zone, through the feed zone, through the ash segregation zone, and back into the combustion zone, in which an ash collecting trough is provided below said diffuser to lie adjacent said path between said ash segregation zone and said combustion zone, in which a conduit leads from the bottom of said ash trough to the bottom of a generally vertical conduit extending outside the housing to above the surface of the bed, means being provided in the bottom of the vertical conduit to fluidise bed material and ash therein, in which a weir is provided in the vertical column over which ash material and any entrained bed material may be ejected, and in which in operation the height of the surface of the bed is controlled by the height of said weir and the material in the vertical conduit is fluidised to a sufficient extent to achieve flow of excess material over the weir.

2. A combustor as claimed in claim 1, in which a baffle having vertical extent is provided to lie in the fluidised bed to substantially separate the feed zone from the combustion zone.

3. A combustor as claimed in claim 1 in which bed material moves downwards in said feed zone in operation of the bed, and material to be burned is fed into a lower part of the feed zone.

4. A combustion zone as claimed in claim 1, in which the air diffuser bed support is divided into separate portions and provided with means for selectively controlling the air flow from those portions individually, a feed portion being disposed beneath the feed zone, an ash segregation portion being disposed beneath the ash segregation zone, and a combustion portion being disposed beneath the combustion zone.

5. A combustion as claimed in claim 1, in which said ash trough includes a floor formed as an air diffuser to fluidise bed material and ash therein.

6. A combustor as claimed in claim 5, in which said ash trough is fluidised in operation at an air velocity to maintain bed material in the bed while allowing ash material to fall into the trough.

7. A combustor as claimed in claim 1, in which a circulation drive air diffuser portion is provided beneath a circulation drive zone of the bed adjacent the combustion zone and on a side thereof opposite to the feed zone.

8. A combustor as claimed in claim 1, in which in operation said circulation takes place in a first mode from said combustion zone through said feed zone and ash segregation zones, and in a second mode through the combustion zone, and said drive zone over and onto the surface of the bed, partly into the feed zone and partly back into the combustion zone.

9. A combustor as claimed in claim 7, in which means is provided to inject further air into the bed material in said drive zone, in the form of pipes or conduits with air outlet nozzles disposed in the drive zone.

10. A combustor as claimed in claim 1, in which a baffle is provided extending above the fluidised bed from one side thereof remote from the feed zone across the combustion zone towards the feed zone.

11. A combustor as claimed in claim 1, in which heat exchange means is provided in the housing to lie within the surface of the bed in operation thereof so that heat may be extracted from the bed.

12. A combustor as claimed in claim 1, in which the height of said weir is adjustable.

13. A combustor as claimed in claim 1, in which the rate of heat extraction from the bed is controlled by varying the height of the bed to adjust the contact of the bed with heat exchange means.

14. A combustor as claimed in claim 1, in which a separately controllable air supply is provided for fluidising said feed zone, said ash segregation zone and said drive zone.

15. A combustor as claimed in claim 1, in which a separately controllable air supply is provided for fluidising said combustion zone.

16. A combustor as claimed in claim 1, in which the diffuser beneath at least the combustion zone and preferably the other zones of the bed comprises a plate having air nozzles in the form of upstanding tubes extending between 20 and 100 millimeters above the plate, and having outlet orifices at or adjacent their upper ends.

* * * * *